United States Patent [19]

Haug

[11] 4,106,798

[45] Aug. 15, 1978

[54] FLUID-TIGHT PIPE COUPLING ARRANGEMENT

[75] Inventor: Albert Haug, Montmorency, France

[73] Assignee: Societe d'Etudes de Machines Thermiques-S.E.M.T., Saint Denis, France

[21] Appl. No.: 749,770

[22] Filed: Dec. 13, 1976

[30] Foreign Application Priority Data

Jan. 22, 1976 [FR] France .................. 76 01697

[51] Int. Cl.² ............................................. F16L 51/02
[52] U.S. Cl. ..................................... 285/226; 285/349; 285/367
[58] Field of Search ............... 285/410, 367, 365, 364, 285/226, 349, 406, 407, 408, 409, 411

[56] References Cited

U.S. PATENT DOCUMENTS

| 2,353,572 | 7/1944 | Kuster et al. | 285/411 |
| 2,470,989 | 5/1949 | Keller et al. | 285/226 X |
| 2,525,652 | 10/1950 | Cuningham | 285/336 X |
| 2,773,710 | 12/1956 | Smith | 285/367 X |
| 3,244,424 | 4/1966 | Cope | 285/165 X |
| 3,328,053 | 6/1967 | Mattimore et al. | 285/365 X |
| 3,421,652 | 1/1969 | Warman | 285/367 X |
| 3,455,013 | 7/1969 | Rayburn | 285/226 X |
| 3,490,794 | 1/1970 | Swanson | 285/226 X |

FOREIGN PATENT DOCUMENTS 453,217  3/1936  United Kingdom ............. 285/DIG. 7

Primary Examiner—Dave W. Arola
Attorney, Agent, or Firm—Jay L. Chaskin

[57] ABSTRACT

A fluid-tight pipe coupling for interconnecting two pipe sections, comprising two flanges integral with said pipe sections, respectively, and clip means for clamping said flanges against each other, the engaging faces of said flanges being flat, one of said flanges having a frusto-conical shape whereas the other flange has a cylindrical shape and said clip is formed with a clamping groove of complementary or mating cylindro-conical shape.

3 Claims, 1 Drawing Figure

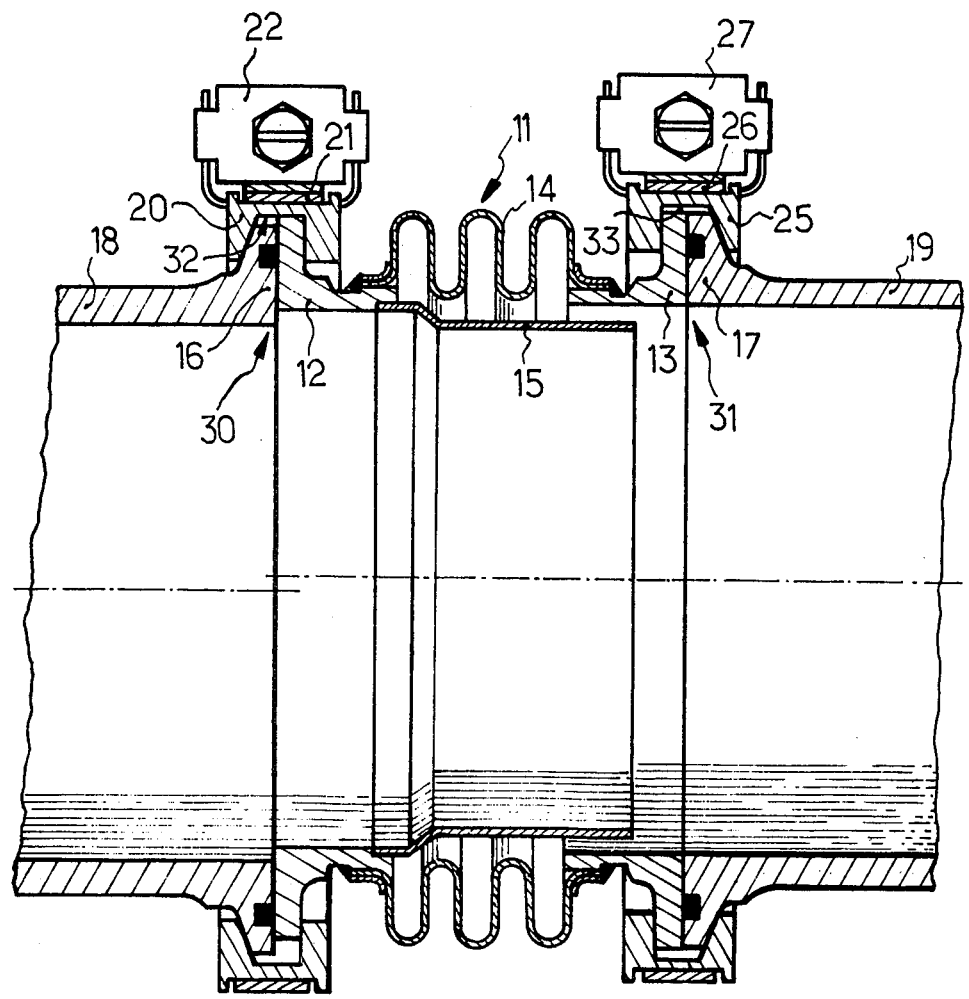

FLUID-TIGHT PIPE COUPLING ARRANGEMENT

The present invention relates essentially to a fluid tight pipe coupling arrangement or a like device for interconnecting in substantially sealing relationship two pipe sections or like duct elements and designed in particular with a view to preventing any possible misalignment of said pipe sections prior to mounting same from giving rise when assembling same to stresses or strains likely to result in a subsequent failure or break.

In some instances the fluid-tight interconnection of a pair of duct elements may raise a number of problems due to the difficulty of providing a strictly accurate alignment or registering relationship of said duct elements before clamping the pipe flanges together with a view to tightly interconnecting same. With the clamping arrangements generally used the tightening of the clip or like clamping strap common to both assembled flanges would indeed result in most cases inautomatically removing any misalignment of the pipe sections thereby generating very large permanent assembly stresses or strains likely to induce subsequent failures or breaks within the pipes. Such a problem becomes very serious when the pipe sections are wholly stiff or rigid and also when one of the pipe sections or like duct elements while being flexible or yielding and deformable is too short to compensate for or absorb the deformation strains resulting from re-alignment. This latter case is in particular met with expansion compensator means which are inserted in series in the exhaust manifolds of some internal combustion engines. A compensator consists of a bellows portion fitted with a coupling flange at each one of its opposite ends. Each flange is adapted to be applied in engaging or bearing relationship against another corresponding flange of that part of the exhaust manifold which it has to be connected or made fast with. It is known to carry out the assembly and the tightening by means of a clamping member or like clip of substantially biconical shape i.e. exhibiting a bilaterally tapering radial cross-section, the co-operating flanges being of substantially complementary or mating conical shape. This kind of assembling is very effective since the reduction in diameter of the biconical clamping member or clip would give rise to a very significant force for clamping the co-operating flanges together. As stated herein above the tightening of the clamping member or clip which is common to both flanges, however, would result in a forced re-alignment of the pipe sections through relative slipping or sliding of both flanges with respect to each other in a radial plane. Such a forced re-alignment would generate very high assembling stresses which will partly affect the relatively fragile compensator bellows so that failures may be caused to occur subsequently at said compensator. The same problem is also encountered when assembling any rigid duct elements.

An outstanding feature of the present invention is that it enables to achieve a clamping of the flanges as effective as previously but without resulting in any forced re-alignment of the pipe sections. Indeed a misalignment occurring upon mounting if not too substantial has not in most instances a really impeding effect (in particular in relation to an exhaust manifold) and only the stresses generated by a forced re-alignment may have serious consequences.

Bearing this in mind the object of the invention is therefore to provide a fluid-tight coupling construction for interconnecting two pipe sections in sealing relationship and essentially comprising two flanges integral or made fast with said pipe sections, respectively, and a clamp or like clip adapted to clamp said flanges against each other i.e. to tightly connect them together, said construction being characterized in that one of the flanges has a substantially conical shape whereas the other flange has a substantially cylindrical shape and said clamp or clip is formed with a groove having a substantially complementary or mating cylindro-conical shape.

The invention will be better understood and further objects, details, characterizing features and advantages thereof will appear more clearly as the following explanatory description proceeds with reference to the accompanying diagrammatic drawings given by way of non-limiting example only illustrating a presently preferred specific form of embodiment of the invention and in which the single FIGURE is a sectional view of an expansion compensator inserted in an exhaust manifold of an internal combustion engine and connected with the manifold by means of a double coupling arrangement according to the invention.

As shown in the drawing an expansion compensator device 11 consists of a bellows member 14 and of a pair of opposite flanges 12 and 13 provided at each one of its opposite ends, respectively. An inner ring-like or sleeve-shaped member 15 is adapted to substantially restore the continuity of the inner wall of the exhaust manifold piping in which the compensator 11 is inserted so as to avoid any interference with the gas flow streaming therethrough. The flange 12 is held in engagement in bearing relationship with a flange 16 located at the upstream end portion 18 of the exhaust manifold whereas the flange 13 is held in engagement in bearing relationship with a flange 17 provided at one end of the downstream portion 19 of the exhaust manifold.

Both flanges 12 and 16 are kept in bearing engagement with each other under the action of a clamp or clip 20 tightly clamped by a metal strap or like band 21 wholly surrounding the clip 20 and tightened in that position by means of a tightening or clamping device 22 known per se which is adjustable by means of a set screw or the like. Both flanges 13 and 17 are likewise kept in bearing engagement with each other under the action of a clamp or clip 25 tightly retained by a metal strap 26 surrounding the clip 25 and tightened by a clamping device 27 adjustable by means of a set screw. The combination of the pair of flanges 12, 16 and 13, 17, of the clips 20, 25 and of the corresponding clamping or tightening means thus forms a fluid-tight coupling arrangement 30, 31 such as referred to herein above.

According to the invention one of the flanges (the flange 12 for instance) of the assembly 30 has a substantially cylindrical shape whereas the other flange 16 has a substantially conical shape. Moreover the clip 20 is formed with a groove or like clamping channel 32 of substantially cylindro-conical shape. The coupling arrangement 31 would of course have the same structure with a flange 13 of cylindrical shape, a flange 17 of conical shape and a clamping groove or channel 33 of the clip 25 with a cylindro-conical shape.

With such a construction of the coupling arrangement the clamping is performed normally owing to the complementary conical shapes of the flanges 16 and 17, respectively, and of the grooves 32 and 33, respectively. When however comparing the coupling arrangements 30 and 31 such as shown with each other it appears that the flanges 13 and 17 of the arrangement 31 are perfectly well aligned in mutually registering relationship because no defective positioning has occurred upon mounting whereas on the contrary with the arrangement 30 the co-operating flanges 12 and 16 have become slightly offset or shifted with respect to each other. Such an offset which is hardly avoidable is due indeed to a defective positioning between both duct elements or pipe sections. As a matter of fact the offset may also in practice be distributed at each end of the compensator. The cylindro-conical structure described herein above of the coupling arrangement enables to retain such a slight offset (which has no impeding effect) after tightening of the clamping clip 20 so that no permanent stress which would be particularly harmful to the bellows member 14 is generated by the assembling and tightly clamping of the flanges 12 and 16.

It should be understood that the invention is not at all limited to the form of embodiment which has just been described and it comprises all the technical equivalents of the means used as well as any combinations thereof when same are used according to the gist and within the scope of the appended claims.

What is claimed is:

1. A fluid tight coupling system for interconnecting in sealing relationship two longitudinally misaligned pipe sections, each said pipe section terminating in a first integral flange, each said first flange having a first contact face, an expansion compensator bellows having opposite ends interposed between the first flanges of the pipe sections, each opposite end of the bellows corresponding to a respective first contact face of said misaligned pipe sections and having at its respective ends a second flange, each said second flange having a second contact face in surface engagement with corresponding first contact faces, sealing means between the first and second flanges for furnishing a leak-tight seal at the engaged first and second contact faces, means rigidly sealingly joining the second flanges to the bellows, one of said first and second engaging flanges having a substantially frusto-conical shape on a side opposite to its contact face and a first peripheral substantially cylindrical surface extending between the frusto-conical shape and the contact face of said one engaging flange and the other said engaging flange having an annular flat surface on a side opposite its contact face and a second peripheral substantially cylindrical surface extending between the annular flat surface and the contact face of said other engaging flange, the engaged first and second contact faces of the first and second flanges being in a plane substantially perpendicular to the longitudinal axes of the pipe sections and, an annular clip member and means for tightening the clip member around said first and second flanges for clamping each of the first and second engaging flanges together to maintain the engagement of the first and second contact faces, the clip member being formed with a clamp portion having a clamping groove with lateral sides of complementary shape with the respective engaged first and second flanges, the bottom of said groove defining a cylindrical surface having a predetermined extent less than the total extent of the first and second peripheral substantially cylindrical surfaces to maintain the engaged first and second contact faces in bearing relationship.

2. A fluid tight coupling system as claimed in claim 1 further including an inner sleeve member having one end joined to one of said second flanges internally of said bellows, and an opposite free end extending to the other said second flange with an annular clearance space provided between the opposite free end of said sleeve member and the other said second flange.

3. A fluid tight coupling system as claimed in claim 1 where said means for tightening said annular clip member includes a circular band surrounding said clamp portion and means for tightening said band around said clamp portion to cause said first and second engaging flanges to bear against each other at said respective first and second contact faces.

* * * * *